United States Patent [19]

Jensen et al.

[11] 4,025,925

[45] May 24, 1977

[54] MULTI-NOZZLE INK JET PRINTER AND METHOD OF PRINTING

[75] Inventors: Donald Frederick Jensen; Ho Chong Lee, both of Endicott; John Carl Tamulis, Binghamton, all of N.Y.

[73] Assignee: International Business Machines Corporation, Armonk, N.Y.

[22] Filed: Jan. 2, 1976

[21] Appl. No.: 646,130

[52] U.S. Cl. .................................... 346/75

[51] Int. Cl.² .................................... G01D 15/16

[58] Field of Search .................... 346/75, 140, 1

[56] References Cited

UNITED STATES PATENTS

| | | | |
|---|---|---|---|
| 3,573,846 | 4/1971 | Ascoli | 346/75 |
| 3,739,395 | 6/1973 | King | 346/75 |
| 3,871,004 | 3/1975 | Rittberg | 346/75 |
| 3,928,855 | 12/1975 | Helinski | 346/75 X |

*Primary Examiner*—Joseph W. Hartary
*Attorney, Agent, or Firm*—John S. Gasper

[57] ABSTRACT

A line printer has a print head with plural nozzles arranged in a single row generally transverse to the direction of relative motion of the print head and a print medium. The nozzles are spaced plural dot positions from each other corresponding to a plural dot segment of a single dot matrix character stroke. When the row of nozzles is slanted relative to the direction of motion, drops from the nozzles are used to print stroke segments in plural character strokes simultaneously.

3 Claims, 9 Drawing Figures

MULTI-NOZZLE INK JET PRINTER AND METHOD OF PRINTING

BACKGROUND OF THE INVENTION

1. Field of the Invention

This invention relates to printing and especially to a method and apparatus for printing with an ink jet. While not necessarily limited thereto, the invention has particular application to serial printers.

2. Description of the Prior Art

Multi-nozzle ink jet printers are well-known. A stream of ink in the form of uniformly-spaced drops is projected from each nozzle toward a print medium while a relative motion is effected between the nozzle and record medium. In one type of multi-nozzle jet printer, such as shown in U.S. Pat. No. 3,298,030, issued to A. M. Lewis et al on Jan. 10, 1967, a nozzle is provided for each line of characters and the individual drops are deflected transverse to the direction of relative motion for a distance equal at least to the length of the stroke of matrix pattern corresponding to the largest data symbol to be recorded. The time required to deflect the streams over the entire character height tends to limit the printing rate. In another type of multi-nozzle printer a row of nozzles is provided for each spot, i.e., dot position in the stroke of the character matrix, see for example, U.S. Pat. Nos. 3,373,437, issued to R. G. Sweet et al on Mar. 12, 1968 and 3,560,641, issued to R. P. Taylor et al on Feb. 2, 1971.

In the nozzle per spot printer, packaging of the multiple nozzles within the space required for conventional character and dot sizes is a problem. Sweet et al. deals with the problem by an arrangement which requires convergent beams. This can present problems in aiming. Taylor et al also recognizes the problem and provides a solution in the form of multiple arrays separated in staggered formation along the path of travel of the medium. Alignment of the multiple arrays and timing requirements can be quite complex.

SUMMARY OF THE INVENTION

It is a general object of this invention to provide an improved ink jet printer.

It is a particular object of this invention to provide an improved ink jet serial matrix printer capable of printing high resolution characters at increased print rates.

It is a further object to provide an improved multi-nozzle serial matrix printer.

The above, as well as other objects, are attained in accordance with this invention by providing multiple ink jet streams arranged in a single row and separated by a distance which constitutes a segment comprising plural adjacent dot positions of character stroke. Each stream is controlled to record a segment of the character stroke, and the multiple streams are so controlled that several segments can be recorded simultaneously. With this arrangement, the streams are projected in parallel thereby simplifying the aiming problem. Also with the spacing of the streams more than one dot position apart, the packaging of nozzles or the like for generating the jet streams is easier to deal with. At the same time, the use of multiple streams provides for an increased printing rate over the multi-nozzle jet printer which uses a single nozzle for a line of characters.

In the preferred embodiment of the invention, the single row of plural streams is slanted relative to the direction of relative motion between the nozzles and the record medium. This slanting affords added distance between nozzles to further ease the task of packaging the nozzles into a recording head. In addition, the slanting permits the individual streams to be individually controlled to simultaneously record plural stroke segments of successive character strokes of a dot matrix character. A selector device is provided for selectively removing individual drops from each stream. A deflector device is also provided for deflecting each stream over the distance of plural dot positions of a stroke segment. In the preferred embodiment the ink is a ferrofluid and selection and deflection of the individual drops is done with electromagnetic transducers arranged in slant with the slanted row of nozzles. The selectors are energized with sequences of binary pulses or the like in timed relation with the flight of the drops while the deflector is energized with a single binary or stepladder signal. Since the distance of deflection is only a portion of the total character stroke length, the time for scanning the plural streams across the entire stroke is greatly reduced over the single nozzle printer thereby increasing the potential print rate.

The foregoing and other objects, features and advantages of the invention will be apparent from the following more particular description of preferred embodiments of the invention, as illustrated in the accompanying drawing.

BRIEF DESCRIPTION OF THE DRAWING

FIG. 5 is a logic diagram of a system for controlling the serial line printer apparatus of

FIGS. 1 – 4;

DETAILED DESCRIPTION OF THE INVENTION

Figure 1:
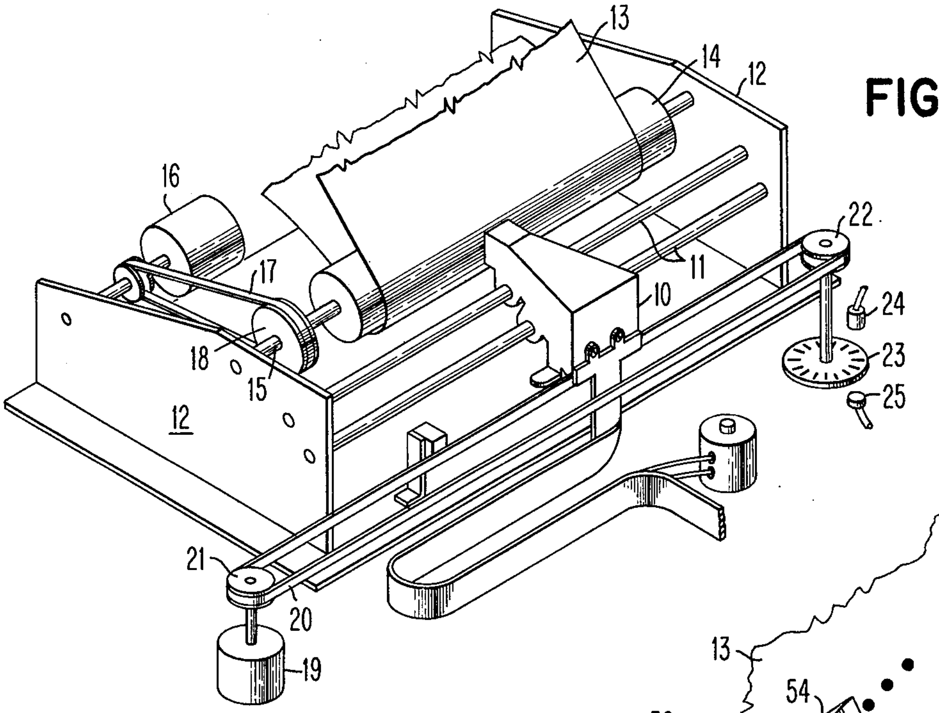
FIG. 1 is an isometric view of a serial matrix line printer embodying the principles of this invention.

As seen in FIG. 1, a serial matrix ink jet line printer comprises a print head assembly 10 slidably mounted on a pair of stationary horizontal guide bars 11 attached to frame plates 12. The print head assembly is reciprocated along the guide bars 11 relative to a print medium such as paper 13. A platen or feed roll 14 supported by a rotatable shaft 15 line spaces the paper 13 when driven by motor 16, belt 17 and pulley 18. The drive mechanism for reciprocating the print head assembly 10 comprises a reversible electric motor 19 which drives a belt 20 arranged around drive pulley 21 and driven pulley 22 and connected to print head assembly 10. A slotted disk 23 is connected for rotation with idler pulley 22. A light source 24 and photosensor 25 co-act with the disk 23 to generate timing pulses in synchronism with the motion of the print head when driven by motor 19. Printing may be done in either direction or in a single direction to record a line of data. In either case, at the end of each line of printing paper 13 is advanced by a line control means (not shown) by operation of the motor 16, which rotates platen 14 to feed the print medium 13 one or more line spaces. At the end of the advance of paper 13 the motor 19 is again activated to move the print head assembly 10 for recording a successive line of recorded data. Various devices and controls are well-known in the art for performing the line spacing and print head assembly drive operations. Details of these operations have been omitted to simplify the description.

Figure 2:
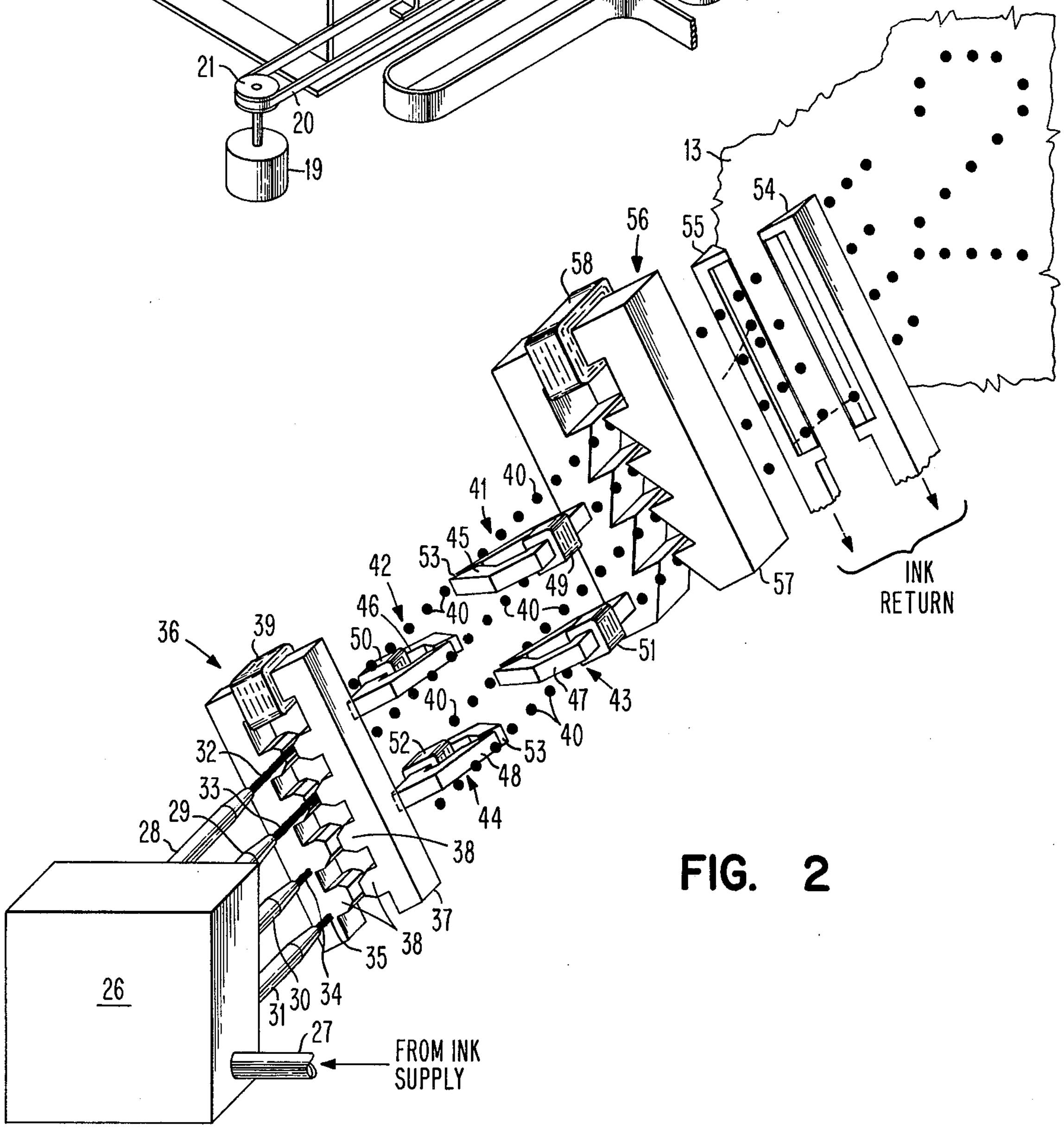
FIG. 2 is an isometric exploded view of the print head assembly of the printer of FIG. 1.

As seen in FIG. 2, the print head assembly 10 comprises a manifold 26 having a connection 27 to a pressurized source of liquid ink (not shown). A plurality of uniformly-spaced nozzle elements 28 – 31, in this case four, are connected to the manifold 27 to receive liquid ink under pressure so that parallel ink streams 32 – 35 are projected from the ends of nozzles 28 – 31 toward the paper 13. Four nozzles 28 – 31 are shown for illustrating the invention; however, any number of nozzles might be utilized depending on the size and number of drops desired for printing of characters on print medium 13. Located downstream from the nozzles 28 – 31 in alignment with each of the streams 32 – 35 is a drop generator 36. In the preferred embodiment of this invention, the ink is a ferrofluid, although other field controllable inks could be used. A type of ferrofluid useful in practicing this invention is disclosed in a copending application of George J. Fan and Richard A. Toupin, entitled "Recording System Utilizing Magnetic Deflection", Ser. No. 284,822, filed Aug. 30, 1972, now U.S. Pat. No. 3,805,272, and assigned to the same assignee as the present application. The drop generator 36 comprises a magnetic core 37 having plural pairs of poles 38 located on opposite sides and in line with streams 32 – 35. A coil 39 is wound on the core 37 and is electrically connected to an energizing circuit which pulses coil 39 at a constant uniform frequency. The core 37 may be a single magnetic lamination or might have multiple laminations so that multiple sets of pole pairs are located along each of the ink streams 32 – 35 so that the pulsing of the winding 39 produces successive perturbations along each stream 32 – 35 to cause break up into substantially uniformly-sized and spaced ink drops 40 in plural parallel streams. While the drop generator 36 is shown as an electromagnetic device, drop generators which are electromechanical such as the well-known piezoelectric or magnetostrictive vibrators could be used. In that event, the drop generators would be mechanically attached to the manifold 26 or to the individual nozzles 28 – 31 to cause vibration and breakup of streams 32 – 35 into individual drops 40 as is well-known in the art.

As practiced in accordance with this invention, individual drops 40 are selectively removed from the individual streams 32 – 35 in accordance with the data pattern to be recorded on the print medium 13. For this purpose, magnetic selectors 41 – 44 are provided. The magnetic selectors 41 – 44 comprise magnetic cores 45 – 48 and windings 49 – 52. Cores 45 – 48 are formed with a gap 53 which causes magnetic field in the space proximate the gap adjacent the trajectories of drops 40 of streams 32 – 35. In the interest of compactness, the magnetic selectors 41 – 44 are located on alternate sides for adjacent streams. Ink drop selection for removal of the drops 40 from the streams 32 – 35 is obtained by applying a pattern of pulses to the windings 49 – 51. Drops 40 in the vicinity of the gaps 49 when windings 49 – 52 are energized are deflected laterally so as to be diverted from the original stream trajectory and are ultimately captured by gutters 54 and 55 located downstream in advance of the paper 13. Since selectors 41 – 44 are located on alternate sides of the streams 32 – 35, gutters 54 and 55 are also located on opposite sides of each of the streams in order to be positioned for intercepting unwanted ink drops 40. Gutters 54 and 55 are made elongate so that each gutter catches drops from the several streams over the vertical distance of a character stroke. Drops 40 captured by gutters 54 and 55 may flow into a pool where the ink is recirculated to the ink supply and manifold 26.

Intermediate the selectors 41 – 44 and gutters 54 and 55 is magnetic deflector 56. The function of deflector 55 is to deflect drops 40 in a direction transverse to the direction of motion of the print head assembly 10 along guide bars 11 and orthogonal to the direction of the streams 32 – 35. Deflector 55 comprises deflector magnetic core 57 and winding 58. As for the selector gaps, the deflector width is to be in the order of 1/2 the drop distance so that the fringe flux would not extend to the adjacent drops.

Figure 4:
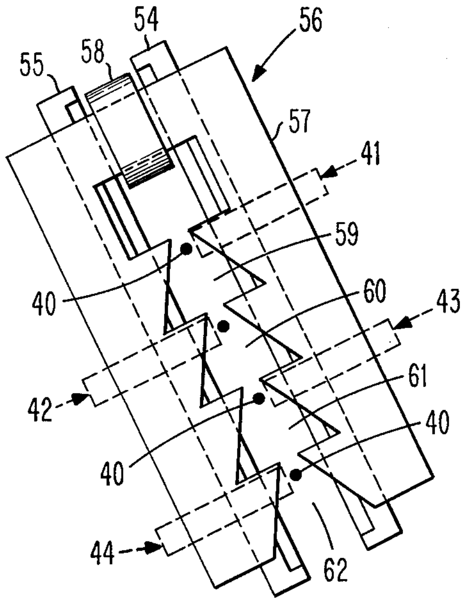
FIG. 4 is an end view of the deflector portion of the print head of FIG. 2 showing the slant angle arrangement with the selector and gutter devices illustrated in broken lines.

As seen in FIGS. 2 and 4, deflector magnetic core 57 has interior gaps 59 – 62. The gaps 59 – 62 may be tapered. Ink drops 40 from streams 32 – 35 are projected to travel through either side of the gaps 59 – 62 toward paper 13. In the FIGS. 2 and 4 streams are shown to be projected through the wide portions of the gaps 59 – 62. During the time interval when drops 40 are in the gaps 59 – 62, they can be deflected toward the narrowest portion of the gaps, the deflection and its amount being dependent upon the occurrence of an energizing pulse or step signal applied from an energizing circuit to winding 58. Ink drops 40, diverted by selectors 41 – 44 are deflected by the energizing pulse applied to winding 58 along with drops 40 not diverted. Ink drops 40 not diverted by selectors 41 – 44 continue the flight toward the paper 13 where they ultimately deposit at dot positions of the various segments of several character strokes of the dot matrix pattern. Ink drops 40 diverted by selectors 41 – 44 are ultimately intercepted by the gutters 54 and 55, thereby producing blanks in predetermined dot positions in the stroke segments of a character stroke.

Figure 3:
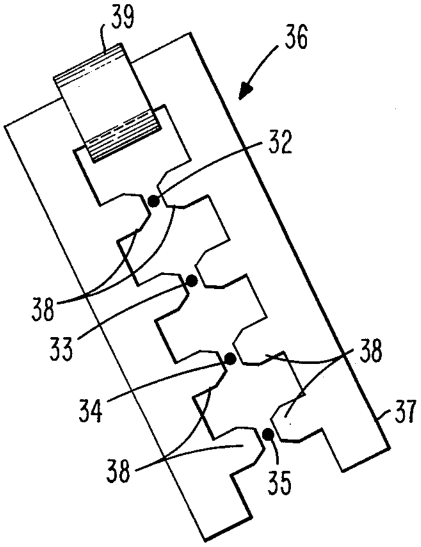
FIG. 3 is an end view showing the slant angle arrangement of the drop generator portion of the print head of FIG. 2.

In the FIGS. 2 – 4, only single coils are shown for the generator and deflector to provide flux for the plural gaps. However, it is noted that any number of additional coils may be provided between poles to ensure uniform gaps for all segments.

Figure 5:
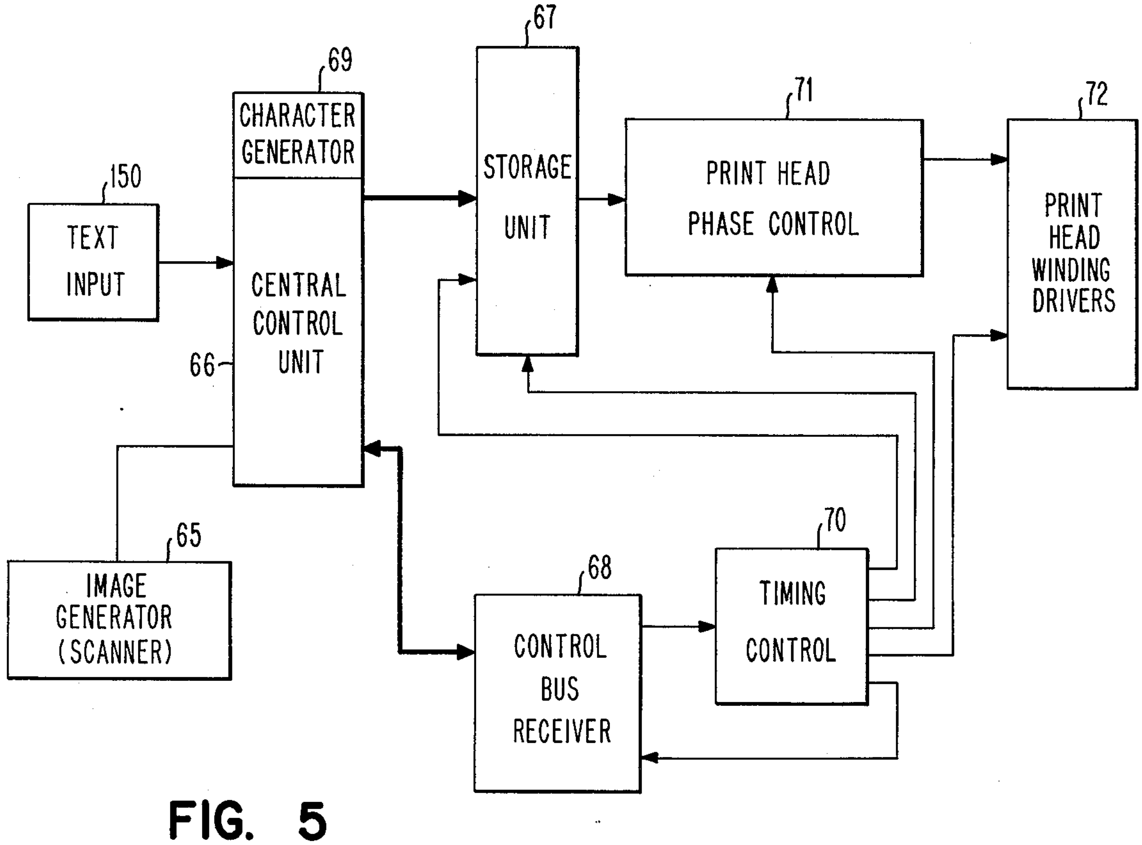

FIG. 5 illustrates a system configuration in which the printer assembly of FIGS. 1 – 4 might be used to record lines of dot matrix characters. This system might include an input device such as an image generator (or scanner) 65 which supplies analog or digital character signals to a central control unit 66 of a data processor. The input may be in the form of text entry through the device 150, in which case, CCU 66 with character generator 69, decodes the text input into dot matrix and store the data in the processor. If the input is made of signals from image generator (or scanner) 65, the data are digitalized in matrix dots and stored in the data processor. For printing, CCU 66 loads the dot data of each character stroke or an image matrix into storage unit 67 and then corresponding electric signals are supplied to selector drivers 72 through phase control 71. The loading sequence of successive stroke data, transfer to phase control are properly timed by CCU 66 in conjunction with timing control 70. At the end of the text line or the last stroke of image matrix, an interrupt request is sent back to CCU 66 by timing control 70 through control bus receiver 68. A timing and control section 70 causes character signals from character generator 69 to be stored in suitable form in data register 67 where they are then transferred in the desired sequence timed by the timing control section 70 to a print head control circuit 71 having an output to the print head winding drivers 72. The system of FIG. 5 is merely illustrative of an overall data processing system. Other system control arrangements may be used.

Figure 6:
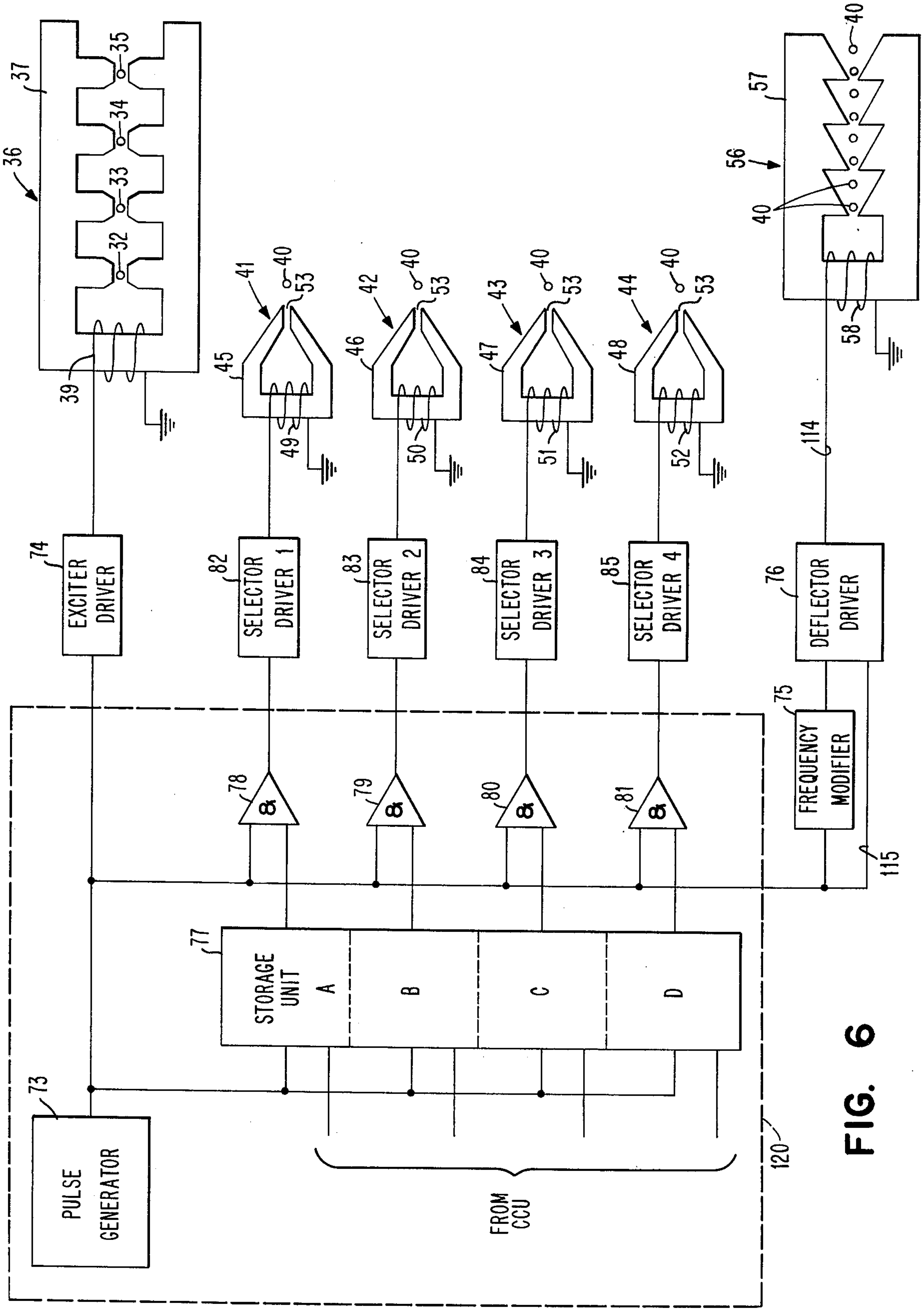
FIG. 6 is a more detailed circuit logic diagram for the drop generator selector and deflector portions of the printer shown in FIG. 1.

In FIG. 6, one arrangement for a print head control 71 is illustrated in schematic form. Timing signals are produced by a pulse generator 73 of well-known type. Pulse generator might include a free running oscillator of the type that could operate at a rate in the range of 30KHz. The oscillator cycles are clocked in usual manner to provide pulses in the range of 30 KHz. Pulses from the pulse generator 73 are supplied to the exciter driver 74 which energizes winding 39 of drop generator 36 to cause streams 32 – 35 to break into drops as previously described. The sense pulse from pulse generator 73 is also supplied to frequency modifier 75 whose output together with the output of pulse generator 73 is connected to deflector driver 76 which is connected to winding 58 of deflector 56. The signals from deflector driver 76 has the stepladder form with step interval corresponding to the interval of the pulse generator signal, but each stepladder restarts periodically with the signal from frequency modifier 75. The frequency modifier 75 operates to convert the frequency rate of pulses from generator 73 to the desired frequency dependent on the scanning cycle of the deflector 56. This in turn is dependent on the number of dot positions of each stroke segment for the streams 32 – 35. For example, if 8 dots constitute a vertical line in the four nozzle configurations illustrated in FIGS. 2 – 4, the number of dot positions for each stroke segment is 2. Thus, frequency modifier 75 would convert the signal from pulse generator to 15KHz so that deflector driver 76 applies a binary signal to winding 58. If the stroke segment were to be 3 dot positions long to form a line with 12 dots, the frequency modifier would operate to change the pulses from generator 73 to 10KHz thereby causing deflector driver 76 to apply a two level step pulse to winding 58.

Further, as shown in FIG. 6, pulses from generator 73 are applied to the sections A – D of storage unit 67 and to one input of AND gates 78 – 81 which are in turn connected to selector drivers 82 – 85. The pulses applied to storage unit 67 cause sequences of signals to be read out of the sections and through AND gates 78 – 81 to operate drivers 82 – 85 causing windings 49 – 52 of selectors 41 – 44 to be energized or not energized in accordance with the desired patterns to be recorded in the stroke segments of the character stroke. In the preferred embodiment of this invention, the windings 49 – 52 of selectors 41 – 44 are energized by d-c current from drivers 82 – 85 to cause drops 40 as they arrive adjacent gap 53 to be diverted from the initial trajectory as described. In order for a drop 40 not to be diverted, drivers 82 – 85 are operated to de-energize windings 49 – 52. Thus, selector drivers 82 – 85 are normally on to remove drops 40 from the streams and turned off by pulses from storage unit 77 when gated through AND gates 78 – 81 by pulses from pulse generator 73.

Various methods of storing the dot bits in storage unit 77 may be employed to practice the present invention. A preferred method is to store a word in each storage unit section corresponding to the character segment to be recorded by each stream from the nozzles. Preferably, each word contains a number of bits corresponding to the number of bits for each drop generated to constitute the dot matrix of the character. Thus, for each stream, in an 8×5 matrix, 10 dot control bits would be recorded in each of the sections A – D of storage unit. A "0" bit would represent a dot position to be left blank while a 1 bit would correspond to a dot position to be recorded by an ink drop 40 from its related stream. Thus, as the print head assembly 10, as seen in FIG. 1, is advanced by drive motor 19, the sequences of pulses from sections A – D of storage unit 77 are gated through AND gates 78 – 81 to operate selector drivers 82 – 85 to selectively energize and de-energize the selectors 41 – 44.

Figure 8:
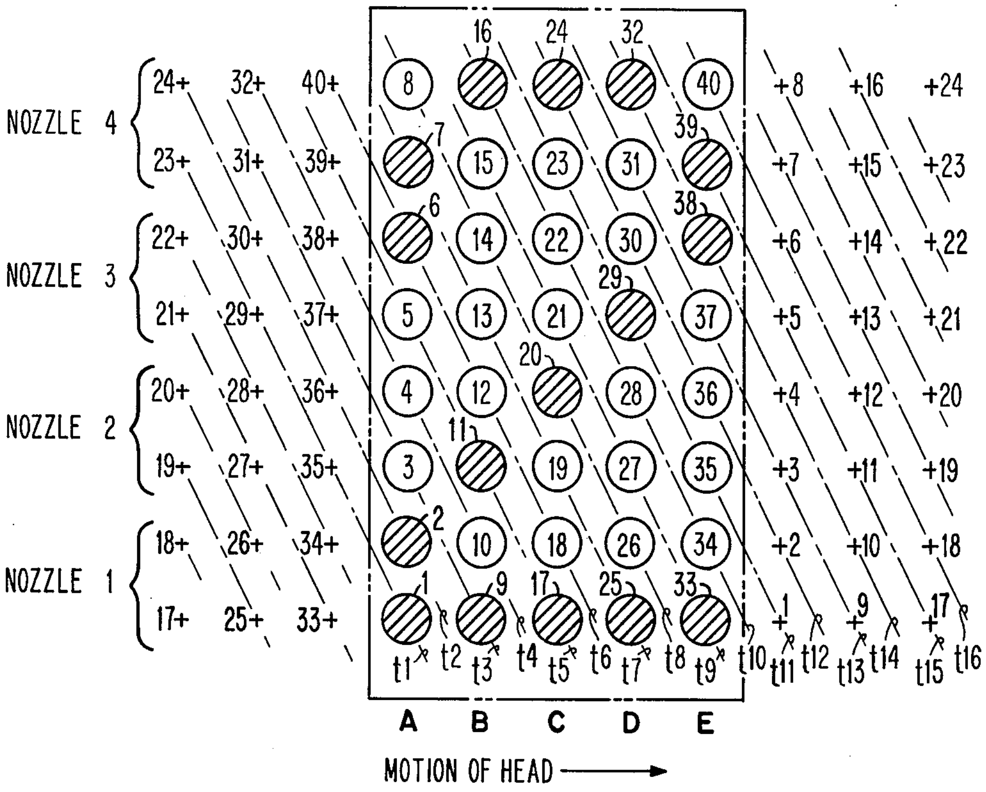
FIG. 8 is a dot pattern/timing schematic illustrating the operation of the circuitry of FIGS. 5 – 7.

As previously described, the nozzles and thus streams 32 – 35 are slanted in the direction of relative motion of the print head assembly 10. Drop generator 36, selectors 41 – 44, deflector 56, and gutters 54 and 55 are correspondingly slanted. This means, of course, that as the print head assembly 10 is advanced along guide rails 11 from left to right, as shown in FIG. 1, the nozzle 31 will arrive at the first column of the character matrix followed by nozzles 30, 29 and 28 in that order. This is illustrated in FIG. 8. At time *t*1, an ink drop 40 from nozzle 31 is in position to be deposited on dot position 1 of column A. At time *t*1, drops 40 from nozzles 30, 29 and 28 are being either diverted to gutters 54 and 55, or used to form parts of previous characters. At time *t*3 drops from nozzles 31 and 30 are available to be deposited at matrix positions B8 and A3 as seen in FIG. 8. At time *t*5 drops 40 can be deposited at matrix positions C17, B11 and A5. At time *t*7 drops from all nozzles are in position to be recorded at the drop positions all for matrix segments in adjacent character strokes.

Figure 7:
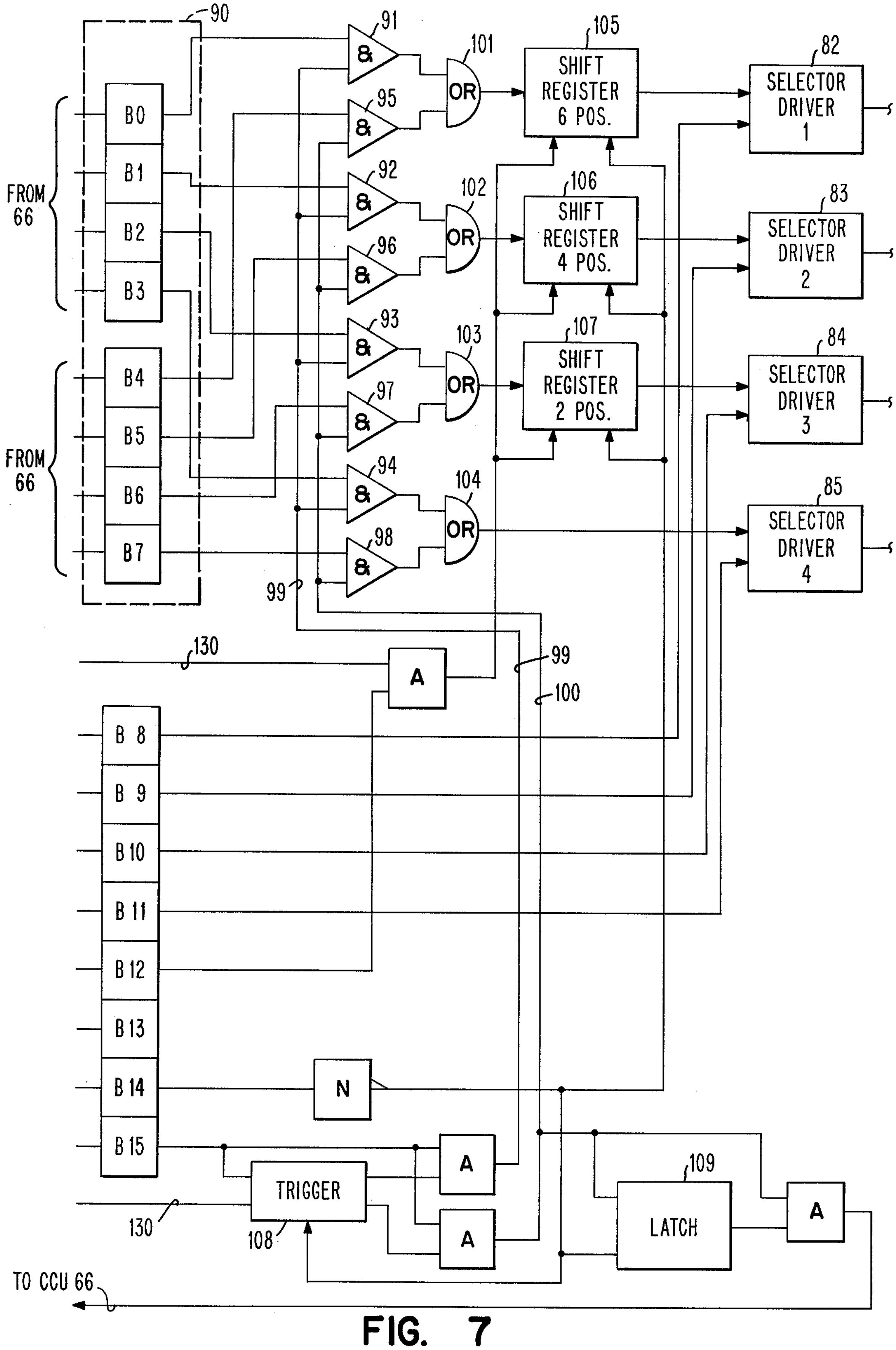
FIG. 7 is a detailed circuit diagram for the character generator portion of the circuit of FIG. 5.

FIG. 7 shows more detailed control arrangement for depositing drops 40 from the various nozzles at the drop positions illustrated in FIG. 8. Data words as previously described are supplied from central control unit 66 of the data processor to the multi-bit registers B0 – B7, which comprise a storage unit 90. In this embodiment, the function of sections A – D is divided into two sets of storage units; registers B0 – B3 stores binary information on odd numbered dot positions and registers B4 – B7 contain data on even numbered dot positions on the character matrix shown in FIG. 8. Thus, as shown in FIG. 7, for each selector drive, the information must come alternatively from one of registers B0 – B7 and one of registers B4 – B7. For this reason the outputs of registers B0 – B3 are connected to alternate AND gates 91 – 94 while the outputs of registers B4 – B7 are connected to alternate AND gates 95 – 98. A Group Select signal on line 99 gates the matrix segment bits from registers B0 – B3 through OR circuits 101 – 104. A Group Select signal on line 100 similarly gates matrix segment bits from registers B4 – B7 through OR circuits 101 – 104.

As previously discussed, nozzles 28 – 31 are slanted relative to the direction of motion and consequently arrive at the first character stroke position at successive time intervals. In the preferred embodiment, as illustrated in FIG. 7, the matrix segment bit signals are gated through OR gates 101 – 104 in parallel. To compensate for the slanting of the nozzles the matrix segment bit signals are delayed or phased to coincide with time of arrival of the ink drops 40 from the separate nozzles 28 – 31. The phase control 71 comprises shift registers 105 – 107 connected between selector drivers 82 – 84. The shift registers 105 – 107 provide the necessary time delay to compensate for the separation of the nozzles 28 – 30 as described. For the specific example illustrated in FIGS. 2 – 4 and 7, as previously discussed, shift register 107 provides a two-position time delay, register 106 a four-position time delay, and register 105 a six-position time delay. Thus, upon a signal from control registers B8 – B12, segment bits are moved from OR gates 101 – 104 and shift registers 105 – 107 into the selector drivers 82 – 85 for selectively controlling the energization of the windings 49 – 52 of selectors 41 – 44. When a complete set of matrix signals is passed through the shift registers 105 – 107, a reset signal from control register B14 resets the shift register 105 – 107, resets group select trigger 108, latch 109, in preparation for a signal from the printer and central processor for gating the next set of character matrix signals from registers B4 – B7.

Figure 9:
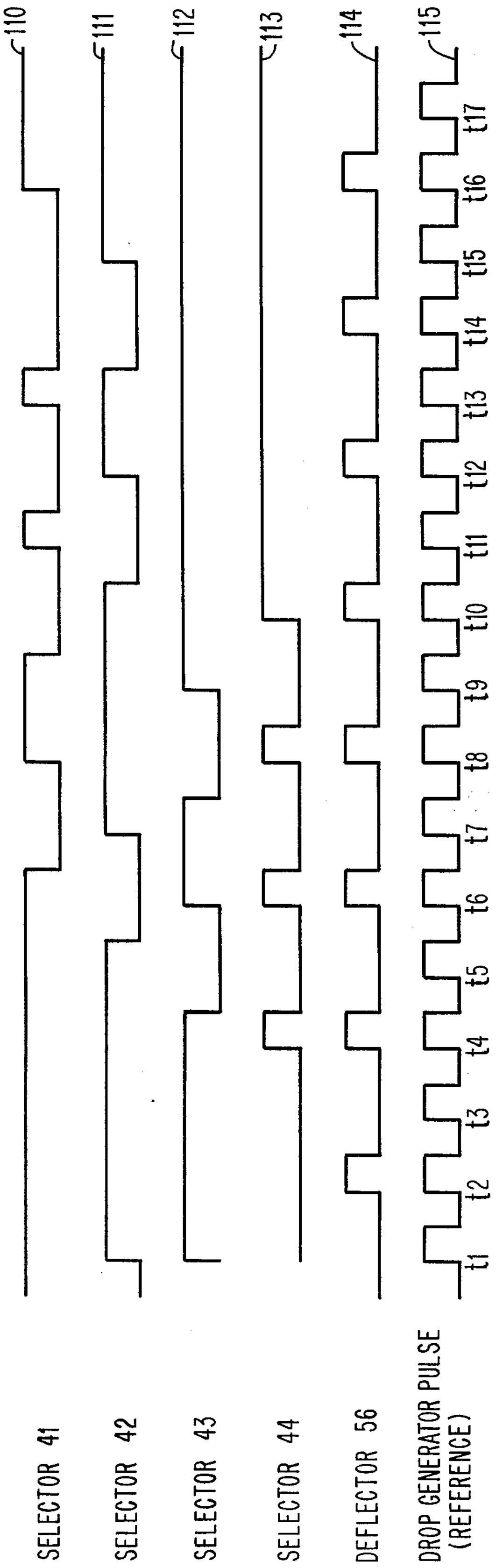
FIG. 9 is a timing chart for the dot matrix pattern of FIG. 8.

FIG. 9 illustrates the timing sequence for the previously described operation. The numerals applied to curves 110 – 113 represent the dot positions of the matrix shown in FIG. 8.

Referring to FIG. 8, there are 8 dot addressable positions for each stroke (column) of matrix. This dot or no-dot information is loaded into data register B0 – B7. As 8 dots are printed by 4 nozzles, it is more convenient to divide data into two parts; the data on odd numbered positions are loaded into B0 – B3 and even numbered dots into B4 – B7. In timing sequence, only an alternate group selection becomes necessary. With this scheme, an extension is simple for other cases where each nozzle prints more than 2 dot positions. For example, 12 dots are printed with 4 nozzles, another set of 4 bit register will be added and three-way group selection cycle will be implemented.

As shown in FIG. 7, CCU 66 controls phasing and timing through control register B8 – B15. The signal from B15 with binary trigger 108, gives alternate signals to lines 99 and 100. AND gates 91 – 98 and OR gates 101 – 104 result in alternate information retrieval either from B0 – B3 or B4 – B7.

The phase control to accommodate the different arrival time of slanted nozzles is accomplished in FIG. 7 by shift registers 105 – 107. As seen in FIG. 8, relative to nozzle 31, nozzles 30, 29 and 28 require delays of 2, 4 and 6 time intervals, respectively. Therefore, shift register 107, 106 and 105 have shift positions of 2, 4 and 6, respectively. Again, obviously for other cases (say 12 dots with 4 nozzles) require different sets of shift registers (3, 6 and 9) positions for 12 dots with 4 nozzles). Each shift is made by signals 130 from shift register clock, which runs synchronously with drop generation pulse, as controlled by signals from shift clock gate B12. Shift registers are reset by the signals from reset gate B14 either at the beginning or at the end of the print line. Also, as seen from FIG. 8, due to the slant angle, there are extra pulses discarded at the beginning and end of print line. Thus, the signal from selection gates B8 – B11 ensures prevention of extra dots at the beginning, at the ends and during any interrupt mode. Latch 109 together with signals from reset gate B14 and group select gate 100 provide interrupt request signal to CCU at the end of the line.

As in the simplified control system shown in FIG. 6, the resulting signals from the selector drivers 82 – 85, for print image of FIG. 8, are the same as those shown in FIG. 9.

In the scheme in FIG. 7 also, the necessary phase adjustment required because of the physical distances between selectors and deflector, as such controls are obvious as noted in conjunction with FIG. 6.

While the invention has been described where the nozzles are slanted, the nozzles may be oriented vertically straight. To compensate the motion of the head, individual deflector gap would be slanted by all the same amount. In that event no phase delays are necessary in this method of multi-nozzle printing, and therefore shift registers 104 – 106 would not be necessary.

While the invention has been particularly shown and described with reference to preferred embodiments thereof, it will be understood by those skilled in the art that the foregoing and other changes in form and details may be made therein without departing from the spirit and scope of the invention.

We claim:

1. Apparatus for printing a line of dot matrix characters comprising, means for projecting plural streams of individual field controllable ink drops on parallel trajectories toward a print medium while effecting relative motion of said projecting means and said print medium, said streams being aligned in a single row extending in a direction transverse to said relative motion, said row of streams being slanted relative to the direction of relative motion, said streams having a relative spacing in said transverse direction corresponding to a plural dot stroke segment of a dot matrix stroke, and means for individually controlling said streams for printing their respective stroke segments to form character strokes including transducer means located proximate each of said streams for selectively removing individual ink drops from each of said streams for causing blanks at predetermined dot positions of said stroke segments, means for selectively operating said transducers for diverting predetermined drops from said parallel trajectories of said streams including means for simultaneously applying a sequence of signals to each of said transducer means, each said sequence of signals having a pattern corresponding with the dots pattern of the matrix segment printed from the corresponding stream, and means for delaying the application of certain of said sequences of signals to said transducers in accordance with relative spacing of said streams in said direction of relative motion, and means for deflecting unremoved ink drops in said streams to predetermined dot positions across the length of said stroke segments.

2. Apparatus in accordance with claim 1 in which said time delay means has a delay interval which is a function of the number of dot positions of said stroke segments.

3. Apparatus in accordance with claim 2 in which, said streams are spaced two dot positions apart in said transverse direction and one stroke distance in said direction of relative motion, and said sequence of signals are binary pulses.

* * * * *